US005416472A

United States Patent [19]

Torii, Jr.

[11] Patent Number: 5,416,472

[45] Date of Patent: May 16, 1995

[54] FIREARM SECURITY SYSTEM AND ACCESS LOCK THEREFOR

[76] Inventor: Dennis R. Torii, Jr., 122 State St., Brooklyn, N.Y. 11201

[21] Appl. No.: 986,433

[22] Filed: Dec. 4, 1992

[51] Int. Cl.[6] ................ G06F 7/04

[52] U.S. Cl. ................ 340/825.32; 340/825.31; 340/825.34; 340/542; 340/533; 70/63; 211/8; 211/64

[58] Field of Search ................ 340/825.31, 825.32, 340/825.33, 825.34, 533, 542, 543; 70/14, 57, 58, 63; 206/317; 49/22, 45, 38, 53, 54; 312/215; 211/64, 8, 9

[56] References Cited

U.S. PATENT DOCUMENTS

| | | | |
|---|---|---|---|
| 2,797,405 | 6/1957 | Stelter | 340/274 |
| 2,958,423 | 11/1960 | Caloiero et al. | 211/4 |
| 3,115,765 | 12/1963 | Fengler | 70/315 |
| 3,731,818 | 5/1973 | Young | 206/16 R |
| 3,881,171 | 4/1975 | Moorman et al. | 340/164 |
| 4,018,339 | 4/1977 | Pritz | 211/8 |
| 4,021,796 | 5/1977 | Fawcett, Jr. et al. | 340/274 |
| 4,236,148 | 11/1980 | Gurvis | 340/568 |
| 4,268,823 | 5/1981 | Rauchut et al. | 340/570 |
| 4,333,074 | 6/1982 | Sutherland et al. | 340/825 |
| 4,637,237 | 1/1987 | Witkoski et al. | 70/285 |
| 4,663,621 | 5/1987 | Field et al. | 340/825 |
| 4,747,280 | 5/1988 | Shaw | 70/279 |
| 4,760,393 | 7/1988 | Mauch | 340/825.31 |
| 4,768,021 | 8/1988 | Ferraro | 340/568 |
| 4,877,131 | 10/1989 | Patros et al. | 206/317 |
| 5,118,175 | 6/1992 | Costello | 206/317 |
| 5,161,396 | 11/1992 | Loeff | 340/825.31 |

*Primary Examiner*—Donald J. Yusko
*Assistant Examiner*—Gregg V. Miller
*Attorney, Agent, or Firm*—Pennie & Edmonds

[57] ABSTRACT

A security system for the containment of at least one firearm in a repository. The security system operates in conjunction with an alarm system adapted to generate a signal upon the emergency or unauthorized opening of the repository indicative of access to and possible removal of the firearm contained therein. An alarm system which generates a signal at a remote location is indicative as to whether the firearm in the repository has been accessed and/or removed either in an intended manner or under emergency and/or duress conditions. Also disclosed is a particular pushbutton lock mechanism suitable for use with a security system of the type disclosed herein.

17 Claims, 10 Drawing Sheets

FIREARM SECURITY SYSTEM AND ACCESS LOCK THEREFOR

BACKGROUND OF THE INVENTION

1. Field of the Invention

The present application relates to a repository for firearms and, more particularly, to a security system for the containment of at least one firearm in a repository which operates in conjunction with an alarm adapted to generate a signal upon opening of the repository indicative of access to and possible removal of the firearm contained therein.

2. Background Art

The proliferation of registered firearms, such as handguns, rifles and shotguns, in the possession of the general public has, in recent years, dramatically increased the necessity of providing secure repositories or safe storage for such firearms or weapons when these are not in use. Portable firearms of this type are currently adapted to be stored in a wide variety of containers, strongboxes, safes and rifle racks, depending upon the kind of firearm. The firearms are locked in these containers to inhibit unauthorized or unlawful access thereto.

Various types of mechanical locking means have been devised for restricted access storage receptacles in which materials of a confidential or dangerous nature are kept. The types of locking devices designed for the security of storage receptacles, specifically those devices which operate mechanically, are limited to perform the single action of unlocking to provide access to the contents of the receptacle. One such device is the permutation lock, one form of which is the common pushbutton lock. Push-button mechanical locking devices have been further developed as a means of security adaptable to location entry access and storage receptacle access. Requiring the entry of an access code, locking devices of this type eliminate the necessity of a key although many of these type devices provide the option as a means of bypassing code entering. The prior art of this type of locking device does not provide for the ability to be unlocked by several codes. The purpose of this feature is to enable the lock to perform two functions simultaneously. The primary function which takes place when an access code has been entered and an actuator knob has been turned is the unlocking of the lock itself. The secondary function which occurs simultaneously with the primary function is that part(s) of the inner lock will protrude from the lock itself to act as an actuating contact to any mechanical or electrical system that is designed to be used by this specific type of lock.

In and attempt to provide adequate, or at least substantially effective, safeguards against the removal of firearms from safes, strongboxes or similar type of repositories, particularly under unauthorized or unlawful circumstances, various types of security systems have been developed in the technology which will afford an indication, such as an alarm or the like, that actual or attempted access has been made to the stored firearm.

Thus, Ferraro U.S. Pat. No. 4,768,021 discloses a safe for a weapon, such as a loaded handgun, in which a box-like container having a hinged closure member is adapted to receive the firearm, and in which the closure member is automatically locked when in its closed position on the container. In order to gain access to the weapon contained in the safe, a keypad is provided thereon which, upon the entry of a specific sequence of numbers or letters, or upon fingerprint identification, will correlate with a preprogrammed sequence of such numbers or letters, or fingerprints, and thereby effectuate opening of the safe and allow for access to the weapon contained therein. Although the foregoing structure provides for a relatively secure storage of the weapon or firearm, an alarm is triggered only in the event that an incorrect program is entered and/or a forcible entry is attempted to the safe, thereby indicating that the weapon or firearm is in process of being removed by an unauthorized person.

Shaw U.S. Pat. No. 4,747,280 discloses a lock device for a rifle rack, in which a timing device constituting a component of an alarm system will trigger an alarm upon an unauthorized opening or attempted breach of a lock device. The only authorized opening of the lock device is either through actuation of a programmed keypad or, selectively, by means of a key which will preclude the triggering of the alarm system. Consequently, when the lock device is opened in a specified manner, such as by the owner of the firearm constrained in the rifle rack, the alarm will not be triggered.

Young U.S. Pat. No. 3,731,818 discloses a storage for a plurality of handguns, in which the latter are secured within a box-like safe or strongbox. However, there is no disclosure of an alarm system which will trigger so as to generate a signal indicative of access to the contents of the safe.

Gurvis U.S. Pat. No. 4,236,148 discloses a theft deterring and signal device for a portable fire extinguisher, wherein the unauthorized removal of the fire extinguisher from a particular location will cause an alarm signal to be triggered.

Other references disclosing containers or storage locations which incorporate alarm signals to protect the contents of a receptacle or valuables at various exposed locations include Field, et al. U.S. Pat. No. 4,663,621; Stelter U.S. Pat. No. 2,797,403 and Rauchut, et al. U.S. Pat. No. 4,268,823.

A considerable need has arisen to ensure that, even in particular instances when the repositories are accessed in a lawful and intentional manner and the firearm removed therefrom, indication of this action should be imparted to suitable law enforcement agencies, such as the local police department or other security services. Moreover, some information should be supplied to the appropriate law enforcement agency as to whether the access to the weapon or firearm in response to the opening of the repository was carried out under duress or in an emergency condition to signal an unlawful situation requiring police action, or as to whether the access to the firearm was intended to be in a normal manner by the owner thereof.

SUMMARY OF THE INVENTION

Accordingly, in order to meet the demands of the public in the provision of a system for the secure containment of a firearm, preferably in a repository, especially when such a firearm may become easily accessible to the owner, and possibly to others than the owner thereof, the present invention contemplates a repository, which for the containment of a firearm such as a handgun or the like, comprising an enclosed container structure having an operable drawer for storing one or more firearms of that type; or in the case of storage for long-barreled firearms such as rifles or shotguns, contains a locking device operating in conjunction with a rifle rack for securely preventing access to and removal of the firearm by any one other than the lawful owner of the firearm. In this connection, the firearm security system, besides the repository, which is either in the form of a closed container or a lockable rifle rack, incorporates a lock release which includes a selectively actuatable keypad-operated electric lock release mechanism and key-operated mechanical lock release mechanism.

In the event of actuation of the electrical lock release, which incorporates a programmable keypad containing either a numerical or alphabetically programmed code, the opening of the repository containing the firearm generates a signal through an alarm system at a location which is remote from the repository, such as at a police station, security service or similar law enforcement agency, that access to the contents of the repository, in effect, possible removal of the firearm contained therein, has been carried out under a certain condition; for example, intentionally by the owner, or under duress or emergency state in which the owner of the firearm is subjected to or expects an unlawful or criminal entry to the locale of the firearm repository.

Alternatively, the repository may be selectively opened by the mechanical release mechanism through manual operation with a key, which will simultaneously deactivate the electrical lock release mechanism, and again generate an alarm signal at the appropriate location of the law enforcement agency as to which kind of access has been made to the firearm in the repository, in all likelihood by the owner of the weapon. In this connection, the firearm security system includes an electrical alarm circuit which is connected with the repository locking device, and in which the release of the latter, through the selective actuation of the electrical or mechanical lock release mechanism, generates a signal at the remote location of the law enforcement agency, while the alarm is silent at the location of the repository, as to which particular lock release has been actuated, thereby imparting information as to whether the access to the firearm was intentional by the owner or effected under duress and in an emergency condition.

In view of the foregoing, it is an object of the present invention to a provide a security system for firearms or the like which will provide immediate information at a remote location of access having been made to firearm stored in a repository.

A further object of the present invention is to provide a firearm security system incorporating an alarm system generating a signal at a remote location indicative as to whether the firearm in the repository has been accessed and/or removed either in an intended manner or under emergency and/or duress conditions.

A more specific object of the present invention resides in the provision of a firearm security system of the type described herein, in which the repository, which may be either a closed container structure for storing a handgun or a locking device for restraining rifles and shotguns in a rifle rack, includes a selectively-actuated lock releases of electrical and mechanical types, in which the activation of a specific one of the lock releases will provide information as to whether access to the firearm contained in the repository was effectuated in an intentional or emergency mode.

A further object of the present invention is the provision of a mechanical push button lock which may be used with these security systems.

This lock may be released by the entry of one of three different codes. Two of the three access codes unlock the locking mechanism to permit access and causes either one of two parts to protrude from the lock housing as an actuating contact. When protruded, the contact can be used to actuate a device, such as an electronic alarm system or other possible security arrangement. The third combination allows access but performs no other function. Codes can be easily changed by the user as desired.

In particular, a multiple access code permutation combination lock that provides for pushbuttons which selectively operate on groups of gears within a housing and, in which part(s) of the lock mechanism protrudes from the inner lock to function as an actuating contact(s) upon the application of two of the three possible access code arrangements is preferred. The combination lock mechanism together with a control knob is connected to a latch mechanism and provides for manual opening of the lock. A control is also provided for easy changing of the combination locking code(s). Thus, a functionally improved permutation push-button combination lock is provided which serve as a controlled access actuator in addition to its inherent locking function.

BRIEF DESCRIPTION OF THE DRAWINGS

Reference may now be had to the following detailed description of exemplary embodiments of the invention, taken in conjunction with the accompanying drawings in which:

FIGS. 8–13 illustrate a preferred mechanical locking mechanism for use with the security system of the invention; in which:

FIG. 8 is a top view of the locking mechanism;

FIG. 9 is a side view, in cross-section, of the locking mechanism of FIG. 8;

FIG. 10 is a top view of the inside of the locking mechanism of FIG. 8;

FIG. 11 is a top view of the bottom portion of the locking mechanism of FIG. 8;

FIG. 12 is a detail illustration of the ball bearing gears of the locking mechanism of FIG. 8; and FIG. 13 is a detail of a side mounting plate for the gears shown in FIG. 12.

DETAILED DESCRIPTION OF THE INVENTION

Figure 1:
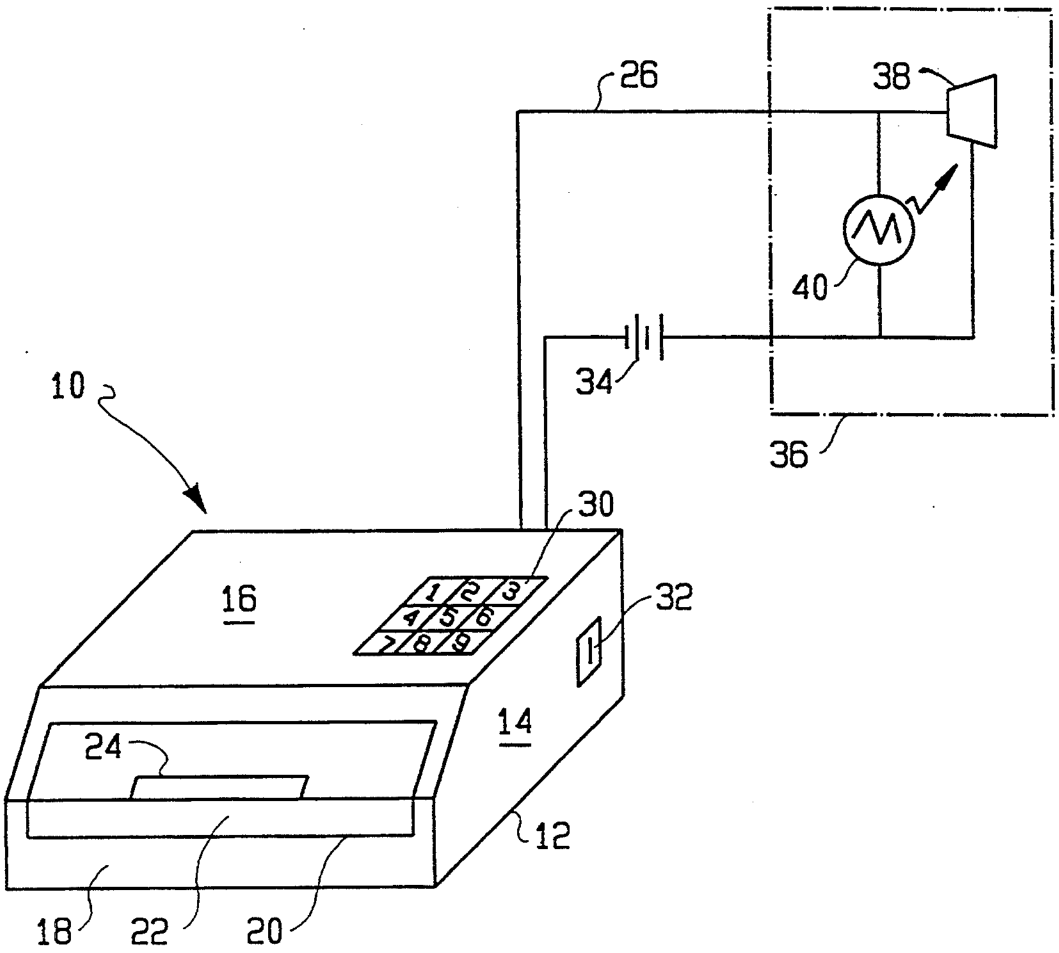
FIG. 1 illustrates a generally diagrammatic perspective view of a first embodiment of a firearm security and alarm system illustrating a repository for the firearm in the closed condition thereof.
Figure 2:
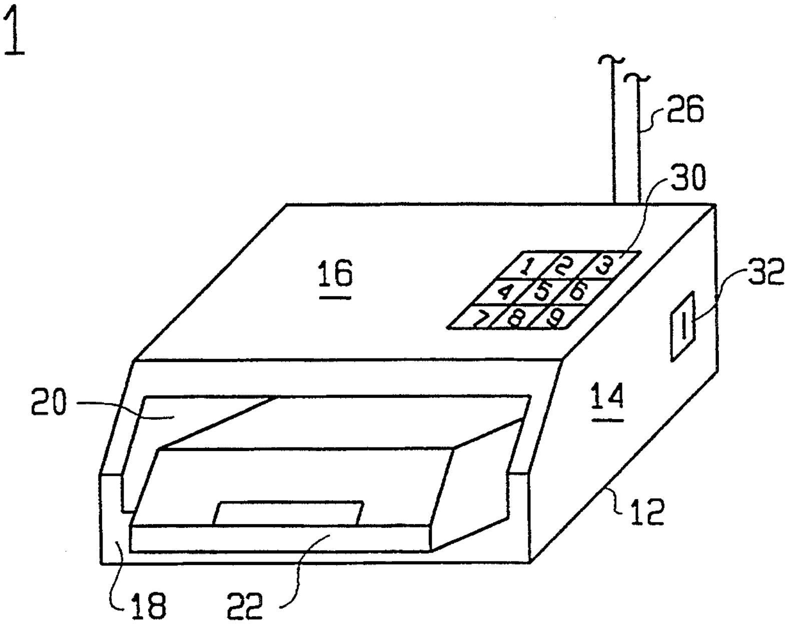
FIG. 2 illustrates a view similar to FIG. 1 showing the repository in an opened condition providing for access to a firearm contained therein.

Referring now in detail to the drawings, and particularly the embodiment of the invention as illustrated in FIGS. 1 and 2, there is disclosed a firearm security system 10 which incorporates a repository 12 for a firearm, such as a loaded handgun (not shown). The repository 12 essentially consists of a box-like container structure, preferably of steel or the like, possessing a generally rectangular configuration having upstanding sidewalls 14, a rear wall, a top wall 16, a front wall 18 with a sloping portion with an opening 20 therein adapted to receive a drawer 22 which is insertable and withdrawable through the opening 20, and which drawer includes a handgrip or recessed wall portion 24 enabling the drawer 22 to be pulled outwardly of the repository 12 when the latter is in an unlocked condition, for either inserting a firearm into the drawer 22 or removing a firearm therefrom.

The firearm security system 10 includes an electrical alarm circuit 26 which is wired to the repository 12 in a manner well-known in the burglar and security alarm technology. The alarm is operatively connected with a repository lock release arrangement, which maintains the drawer 22 in a locked condition when the latter is inserted into the repository 12, and wherein the lock release arrangement includes an electrical lock release 30 which may include either a numerical or alphabetical manually-operated keypad having a predetermined lock releasing sequence programmed therein, the keypad possibly including luminescent material to enable viewing and operation thereof in the dark, and mechanical lock release 32 which is adapted to be operated through the intermediary of a key insertable therein in selective actuation with the electrical lock release 30.

The security alarm circuitry 26 which is connected to the repository 12 incorporates a source of electrical power (not shown), and in addition thereto, a battery 34 so as to enable functioning of the alarm system in the event of a power outage for a predetermined period of time. The alarm system 26 communicates with a remote location 36, which may be a police station, a security service or other law enforcement agency such that, in the event a signal is generated in response to the opening or unlocking of the repository 12, emit an audio alarm signal at 38 and/or a light signal at 40 at that location 36.

A firearm, such as a loaded handgun, is positioned in the drawer 22, and the latter is inserted into the repository 12 so as to cause automatic locking of the drawer in the repository. When it is desired to remove the firearm from the repository 12, a suitable numerical or alphabet sequence may be imparted to the keypad 30. This sequence upon being introduced into the keypad, when it corresponds to a sequence programmed or encoded therein, will cause the locking mechanism to release the drawer 22, thereby allowing the drawer to be pulled out of the container through opening 20 by engaging the gripping recess 24, and permitting for removal of the firearm stored therein. Simultaneously with this actuation of the electrical lock release 30, the mechanical lock 32 will be deactivated, and the opening of the drawer 22 will cause the alarm circuit 26 to generate a signal at the remote location 36; however, without any visual or audio signal being in evidence at the location of the repository 12, in effect, causing the triggering of a so-called "silent alarm", and producing an audio and/or visual signal at, respectively, locations 38 and 40, signaling that access to and possible removal of the firearm from the drawer 22 has been implemented. When the correct code is entered into the keypad 30, the signal provides an indication that the opening of the repository 11 has been effectuated through actuation of the electrical lock release 30, and that the access is being made by an authorized person.

If an incorrect code is entered, such as the reverse digits of the correct code, remote location 36 is notified, again by a silent alarm, that the opening the repository is being made under an emergency condition by the owner under duress. The remote location then notifies the appropriate law enforcement personnel to investigate the matter.

Alternatively, the closed repository 12 containing the firearm may be opened by inputting yet another code into the keypad 30, which code does not trigger or send any alarm to the remote location. Thereafter, access to the firearm may be made by inserting and operating a key in the mechanical lock release 32. In the event of a power failure, it will also be possible to obtain access to the cabinet by inserting the key into the mechanical lock release 32, which simultaneously deactivates the electrical lock release 30.

Although the container-like repository 12 is shown as being in a horizontal position, it can be mounted on a wall or floor as to be fastened thereto in any suitable orientation. Moreover, the repository 12 and drawer can be either constructed of a steel alloy or similar high-strength material, and may also contain bullet-proof wall surfaces of materials such as Kevlar, which should cause any accidental discharge of the firearm to render the projectile harmless.

The keypad can be directly linked to a transmitter which operates the telephone to contact the remote location, or it can be part of a so-called "panic switch". A typical wireless panic switch includes a base unit having outputs for normally open and normally closed loops, and can send an alarm signal to either type of loop after receiving an appropriate signal from the wireless unit. The wireless unit is used to trigger the base unit. Once a signal is sent to the base unit immediately processes the information and takes the appropriate action, such as dialing the remote location when the reverse code is received. Pressing just one button will produce a test signal, which will light an LED at the base unit but not trigger a full alarm. The radio link operates on a frequency of approximately 382 Mhz; maximum range is approximately 200 feet outdoors and 60–100 feet indoors.

To prevent interference from other sources of RF energy near 382 Mhz, when a wireless pad is used, the present invention contemplates switches to enter an eight-bit security code for both the base and wireless units. This code will be sent by the wireless unit, and the base unit will not respond to any signal that does not contain this code. The recognition of the code can be as described above.

Figure 3A:
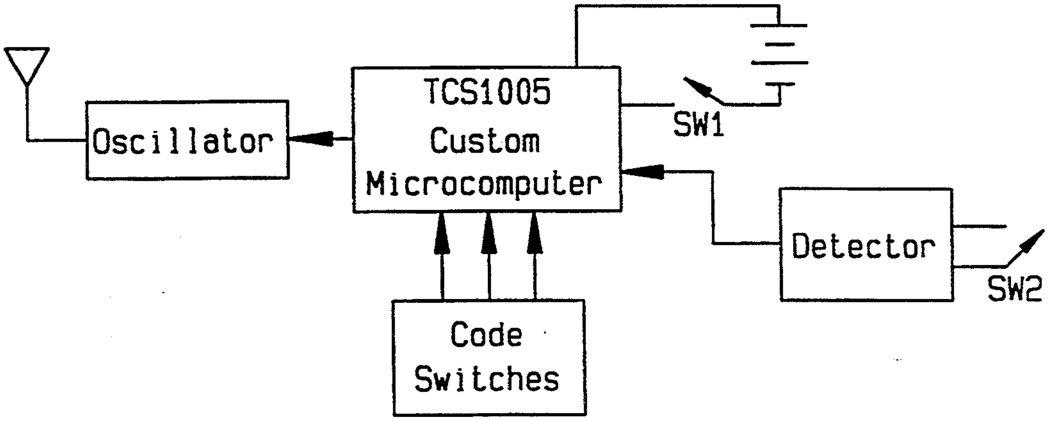
FIG. 3 is a diagram of the base and remote units of the wireless switch of the invention.
Figure 3B:
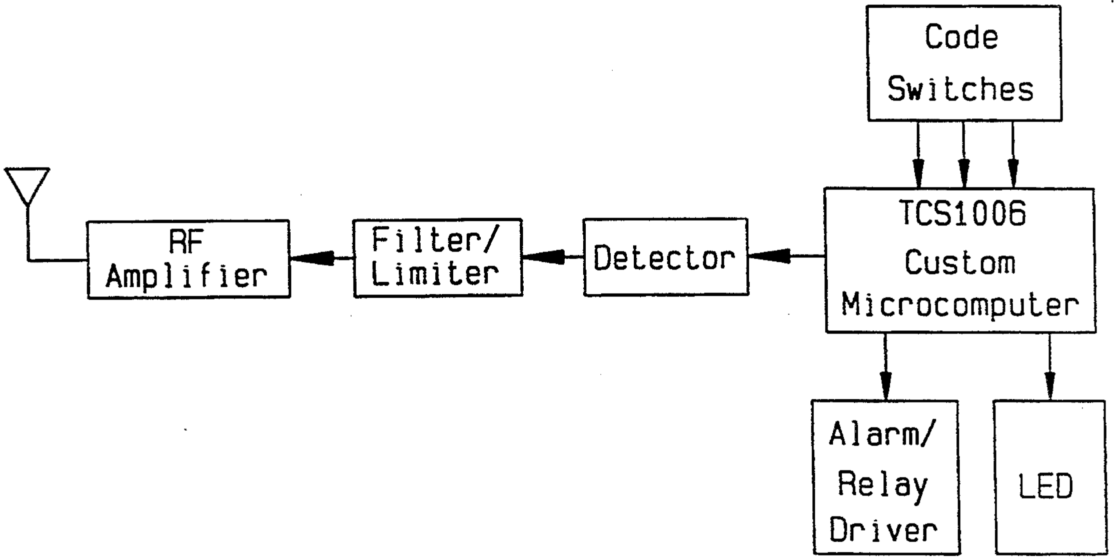

The heart of both the base and wireless units is a custom single-chip microcomputer. The wireless unit uses a TCS1005 and the base unit uses a TCS1006. In addition to the arithmetic and logic circuitry, both devices include internal RAM and ROM as well as a clock generation circuit. There are also input and output ports on both devices. FIG. 3 shows block diagrams for both the wireless and base unit. In both cases, the security code is determined by mechanical switches connected to the single-chip microcomputer. The TCS1005 supplies an output signal to modulate the oscillator stage, which consists of a single transistor. The output frequency is determined by tuned networks of capacitors and inductors; the inductors are microstrips formed other circuit board itself. Two switches, labeled SW1 and SW2, are connected to the TCS1005. Switch SW1 is, operated by entry of the code in the correct sequence, causes a signal to be sent to the base unit, which lights a LED and informs the remote location that the repository is being accessed by an authorized user. Thus, it does not trigger an alarm. Note that SW1 closes the battery power supply circuit and that SW1 must be closed to activate the wireless unit. If the code, is entered in reverse, SW2 closes to activate a panic detector stage, which uses a single transistor. This stage sends a signal to the TCS1005. When both SW1 and SW2 are closed, the wireless unit will radiate a signal. The TCS1005 will add a security code to this signal depending upon the setting of the switches connected to it.

Several layouts for simple electronic locking systems are provided herein. In each case, it should be understood that the components are selected to suit the conditions of an actual situation. In all of the layouts, the system voltage values have been omitted, as they can vary. In nearly all cases the systems will be 12 or 24 volts.

Figure 4A:
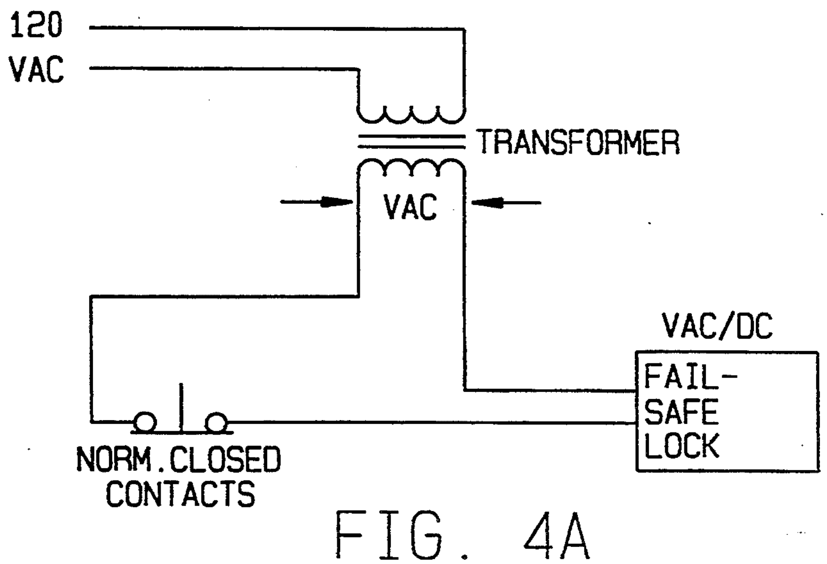
FIGS. 4A–4F illustrate various AC and DC electronic locking circuits for use in the present invention.
Figure 4B:
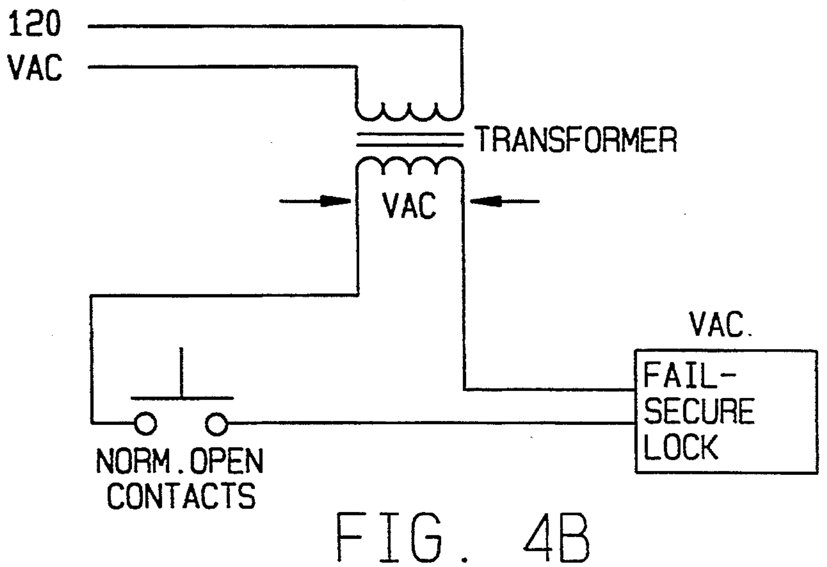
Figure 4C:
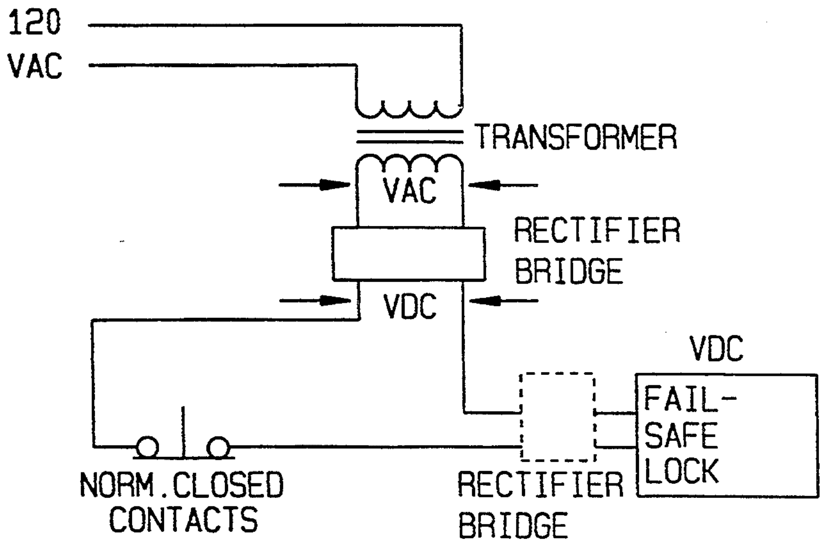
Figure 4D:
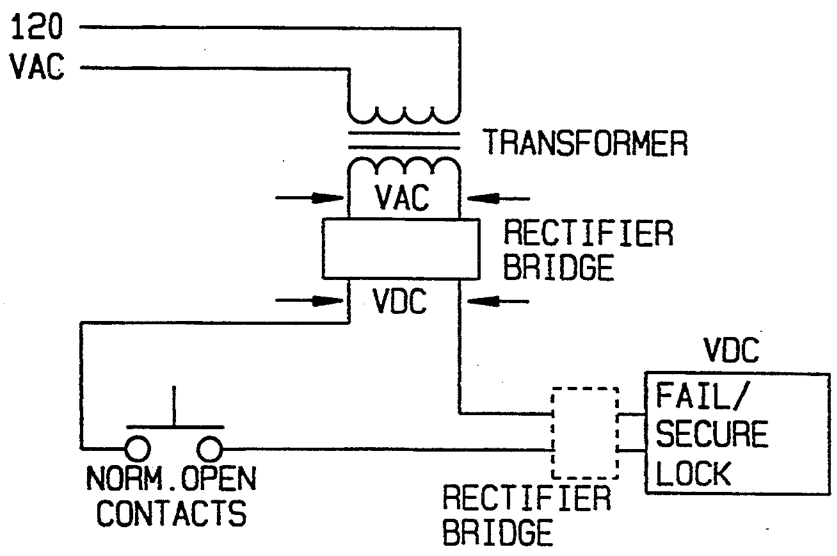
Figure 4E:
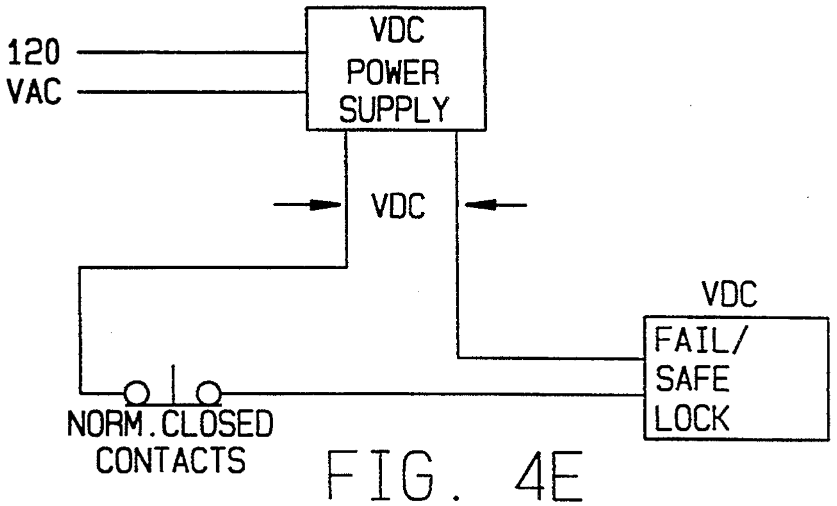
Figure 4F:
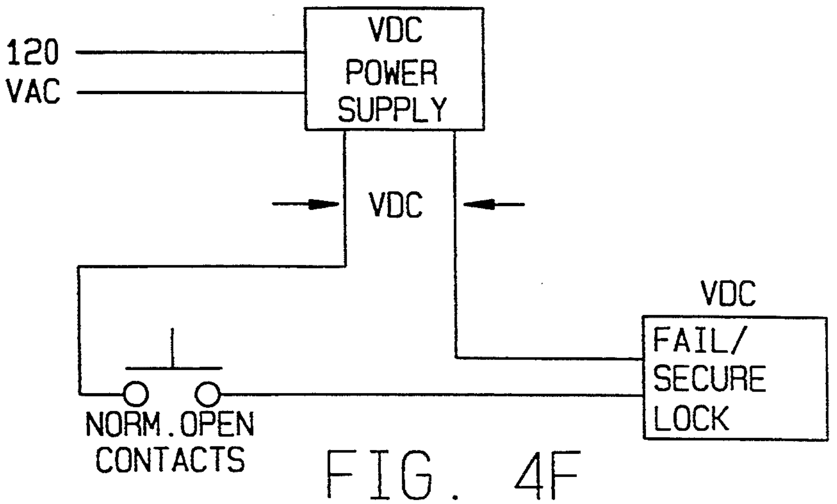

FIGS. 4A–4F illustrate the use of the transformer, rectifier, and DC power supply. As shown in FIGS. 4A and 4B, a lock rated for AC operation needs only a transformer as a power source. FIGS. 4C and 4D show a DC lock, which needs the addition of a rectifier to change AC to DC before power enters the lock. The rectifier can be located at the transformer or at the lock. An alternative method for powering DC locks is to provide a DC power supply, as shown in FIGS. 4E and 4F. Other diagrams provided in this section will show circuits for other specific types of locks.

Figure 5A:
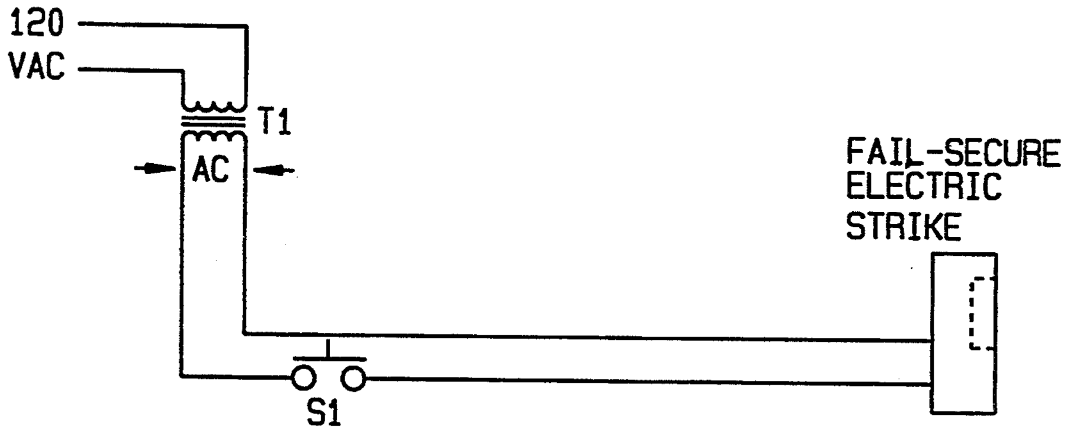
FIGS. 5A–5C show various electric strike systems for use in the invention.

The three diagrams in FIG. 5 show simple electric strike circuits. As shown in FIG. 5A, the transformer (T1) supplies AC to the strike when the normally open switch (S1) is closed. The strike releases with a buzzing sound, which acts as an "open" signal.

Figure 5B:
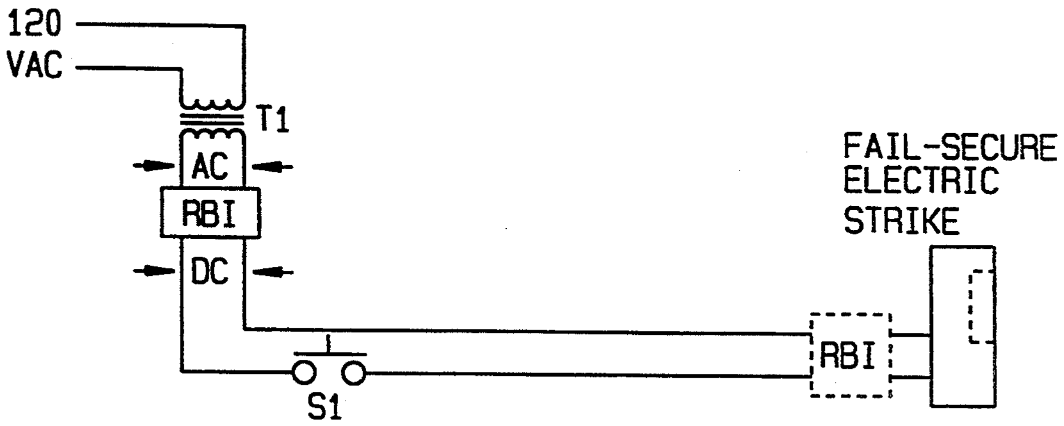

In FIG. 5B, the transformer (T1) supplies AC to the rectifier (RB1), which converts it to DC. When the normally open switch (S1) is closed, the DC power releases strike silently. The rectifier may be wired to T1 secondary or to strike leads, as shown.

Figure 5C:
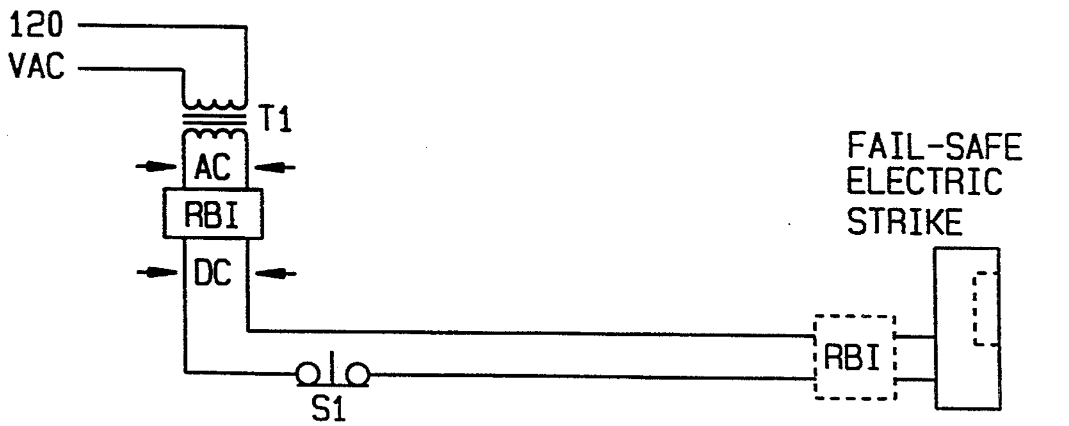

In FIG. 5C, the fail-safe operation requires that DC be continuously supplied to the strike through the normally closed switch (S1). If the rectifier (RB1) were not used, the strike would buzz constantly during the locked cycle. Opening the switch contact releases the strike by interrupting power.

Figure 6A:
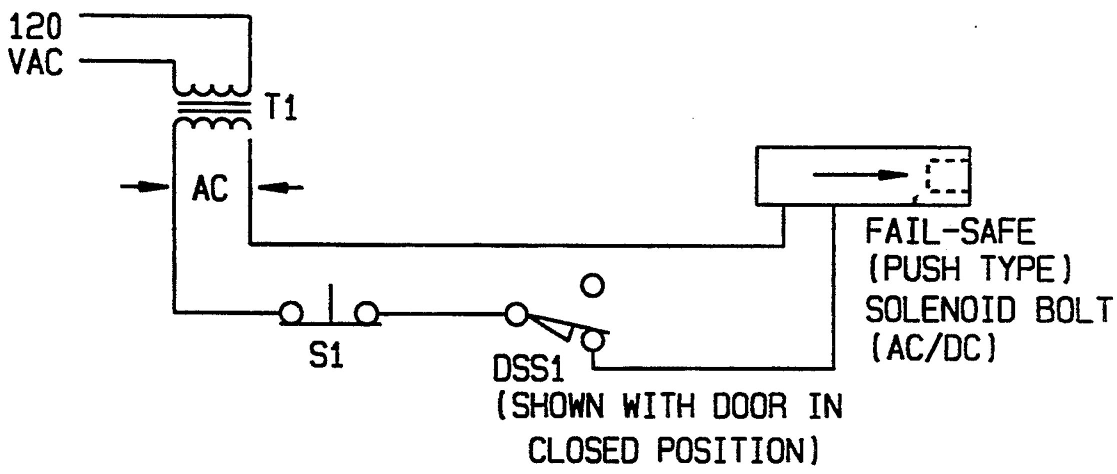
FIGS. 6A–6B illustrate diagrams for fail-safe and fail-secure solenoid operated belts.

FIG. 6 shows diagrams for fail-safe and fail-secure solenoid-operated bolts. In FIG. 6A, the fail-safe operation requires that all switches be closed before the transformer (T1) supplies power to energize the solenoid and project the bolt. A door status switch (DSS1) is used to ensure that power will not flow to the solenoid unless the door is closed. This switch keeps the bolt from projecting while the door is open; it is sometimes called the automatic relock switch. Note that closed switches are wired in series.

Figure 6B:
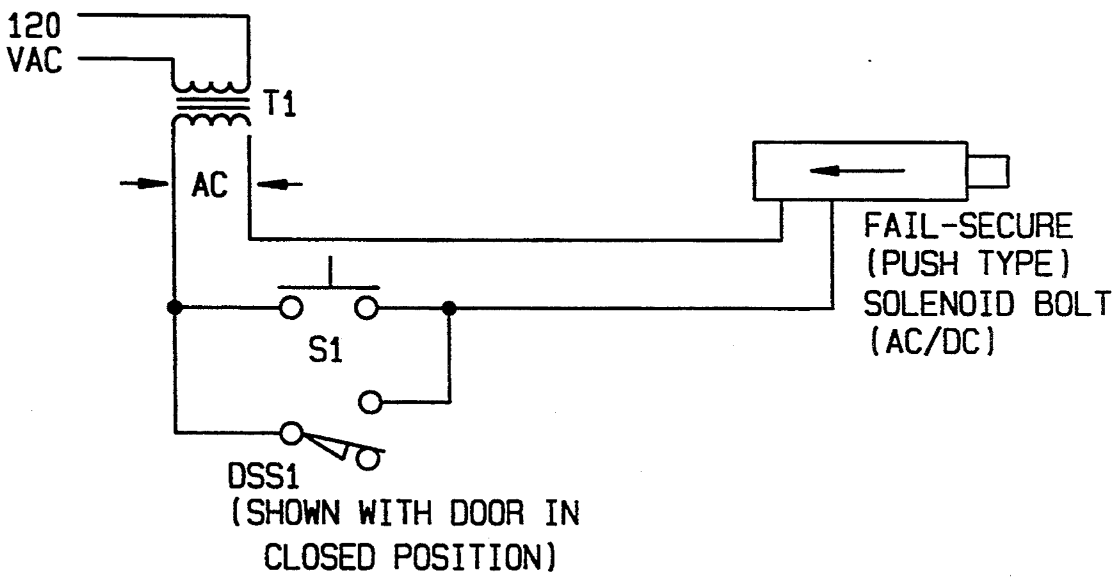

In FIG. 6B, the fail-secure bolt is normally projected without power. The closing switch (S1) allows the transformer (T1) to supply power to the solenoid, retracting the bolt. When the door is opened, the door status switch (DSS1) closes, keeping power on the solenoid, even if the control switch (S1) is reopened. This switch ensures that the bolt will not project while the door is open. Note that open switches are wired in parallel.

Many solenoid-operated bolts are available with built-in rectifiers and many are operated from AC or DC. If a rectifier is required separately, it may be wired as shown in FIG. 5.

Figure 7:
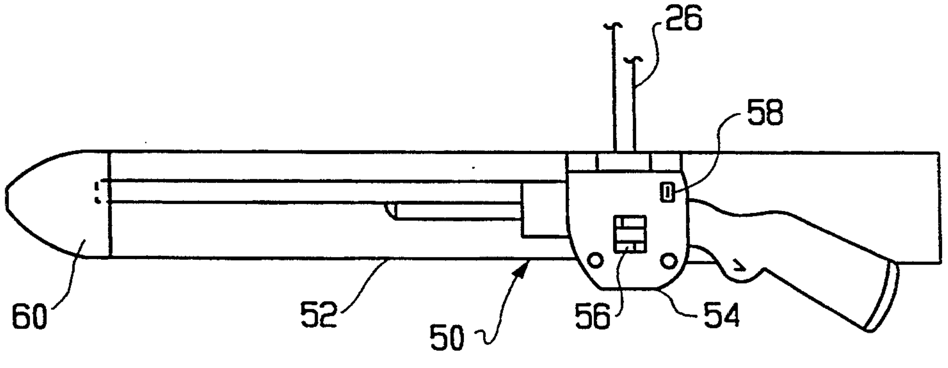
FIG. 7 illustrates a rifle rack having a rifle or shotgun supported thereon and incorporating a firearm security and alarm system pursuant to the invention.
Figure 8:
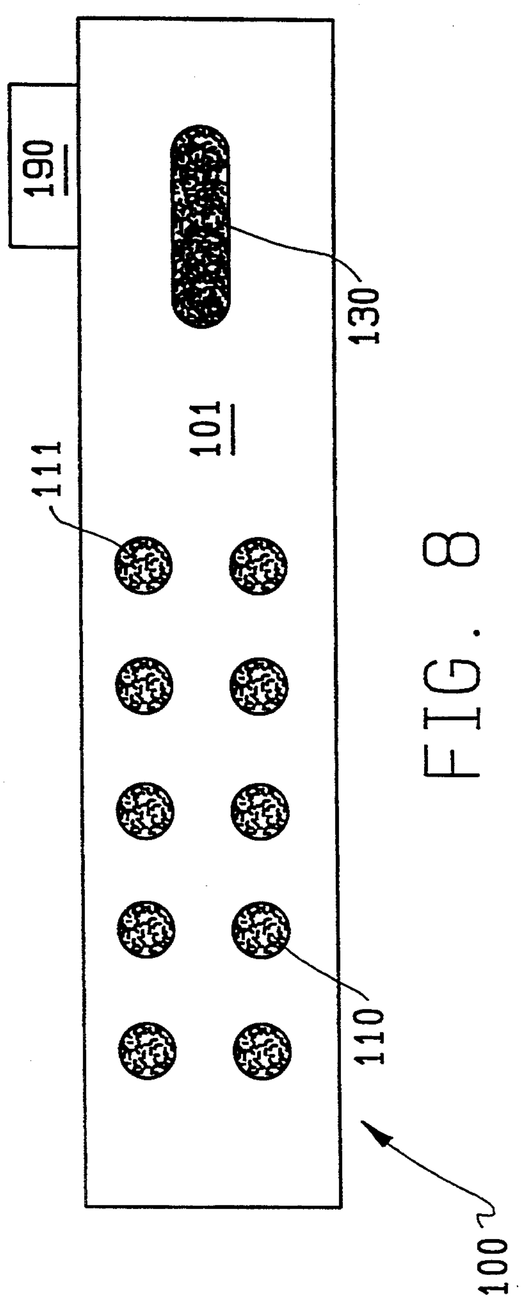
Figure 10:
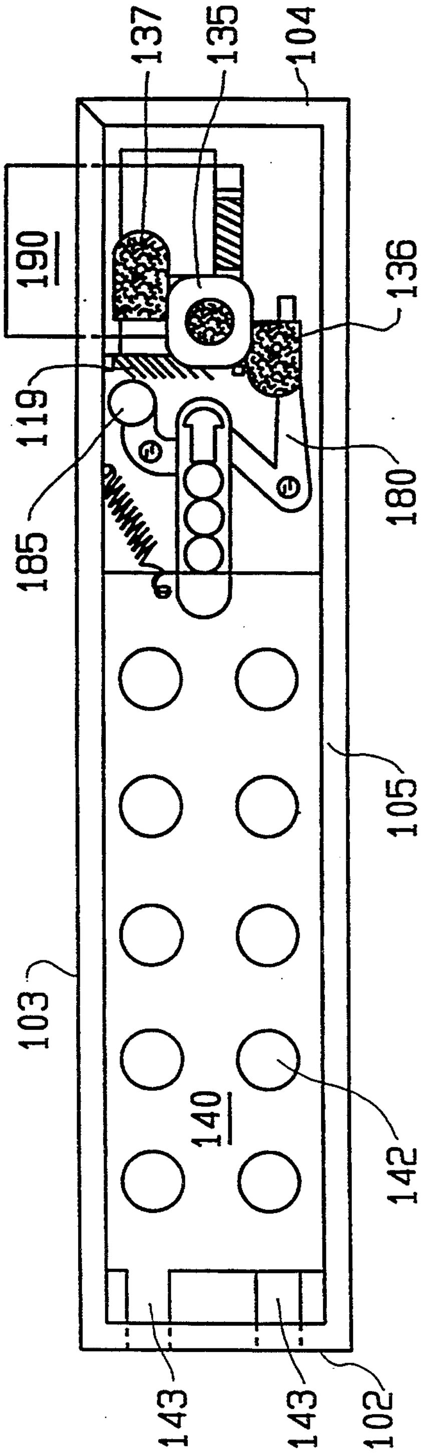
Figure 9:
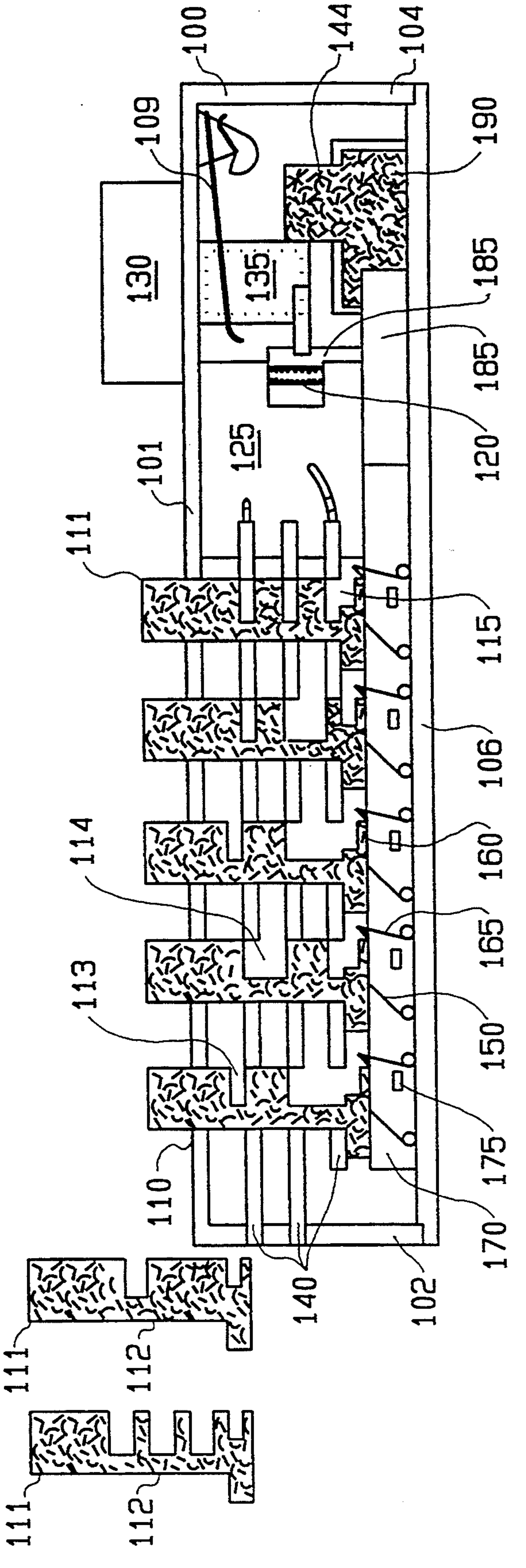
Figure 11:
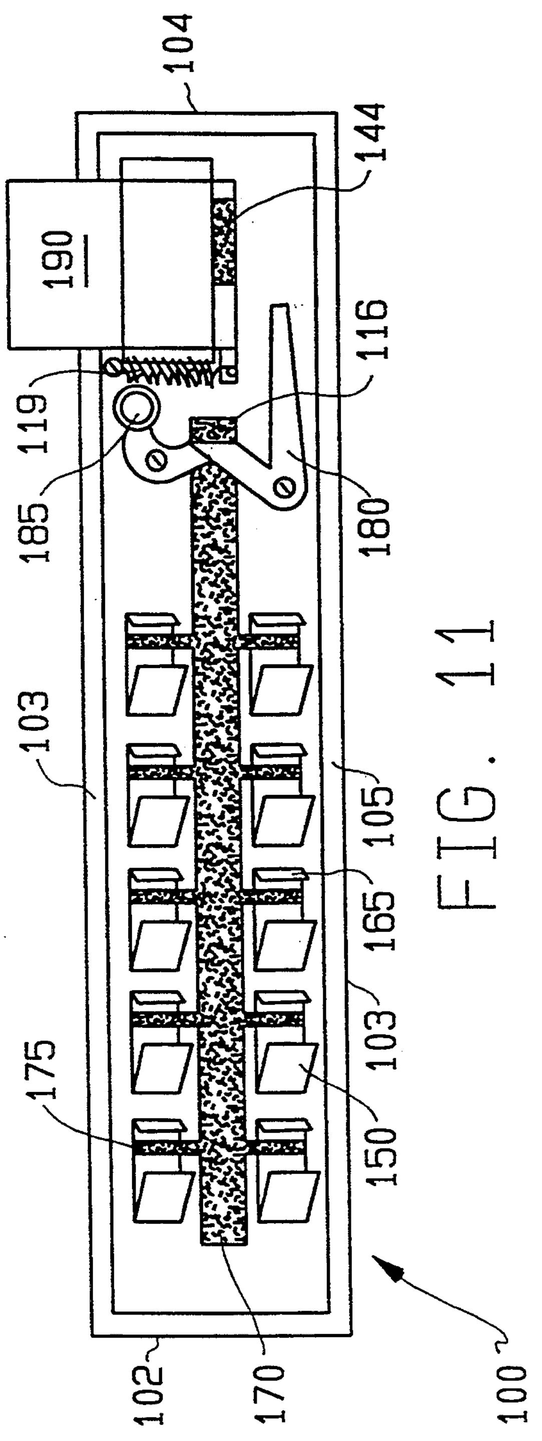
Figure 11A:
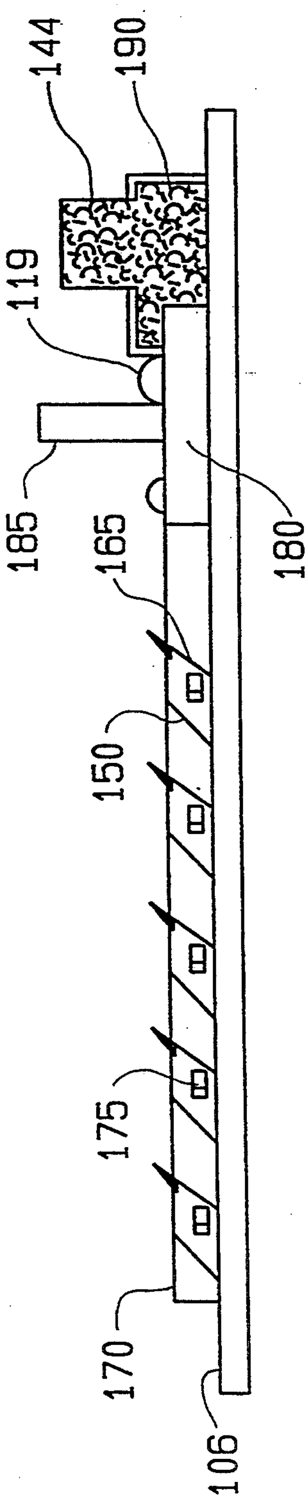
FIG. 11A is a side view of the bottom portion of the locking mechanism of FIG. 8.

In the embodiment of FIG. 7 of the drawings, the electrical system 26 is substantially identical to that of FIG. 1, and need not be further described in detail hereinbelow. In this particular embodiment, rather than a container-shaped repository 12, the firearm security system 50 encompasses a rifle rack 52, having a rifle mounted thereon in a manner which is well-known in the art, such as by supporting hooks or the like, and in which a hinged locking device 54 as a component of the rifle rack 52, while covering the trigger mechanism of the rifle or shotgun which is suspended from the rifle rack 52, and latches to the back wall surface 55 of the rifle rack so as to constitute a locking and protective structure which will restrain the firearm within the rifle rack while concurrently preventing access to the trigger mechanism of the former.

The locking device 54, in a manner similar to the embodiment shown in FIGS. 1 and 2, includes a keypad 56 which may be either alphabetical or numerically programmed, and also includes a mechanical key-operated lock release 58, both of which are connected to the alarm circuit 26 in the same manner as in the preceding embodiment.

Thus, when it is desired to remove the firearm, in effect, the rifle or shotgun, from the rifle rack 50, it is merely necessary to actuate the electrical lock release 56 or selectively the mechanical lock release 58 in a manner analogous to and with a result analogous with that described with regards to the previous embodiment and the unlocking of repository 12, thereby triggering an alarm signal at remote location 36 indicating that access has been made to the firearm in accordance with a predetermined condition depending upon which lock release 56 or 58 has been selectively actuated.

Furthermore, the end portion 60 of the rifle rack 50 which is adapted to receive the muzzle portion of the rifle or shotgun barrel may be of a cone or pocket-shaped configuration, consisting of an essentially bullet-proof material such as Kevlar, so as to render any projectile harmless upon an inadvertent discharge of the firearm.

From the foregoing, it becomes readily apparent that the inventive firearm securing system 10 or 50 clearly meets a current need for providing a secure containment for firearms, while concurrently providing rapid and accurate information through the intermediary of the alarm system 26 as to any opening of the repository 12 or rack 52 for the firearm, and the manner in which access has been made; in essence, either unauthorized or intended depending upon the particular lock release mechanism which has been actuated.

FIGS. 8–13 illustrate a mechanical pushbutton lock 100 which may be used either alone or in combination with the electronic security system of the invention. This lock is accessible only by entry of one of three possible codes. Two of the three codes cause one of two parts of the inner lock to protrude and serve as an actuating contact to whatever either engage the electrical security system or to operate other devices in conjunction with this lock.

Lock 100 has a housing made of two parts. The top part includes face plate 101 and four sidewalls 102, 103, 104, 105. The bottom part includes a base plate 106 upon which are mounted various operating components which will be described hereinafter. Face plate 101 includes a plurality of apertures in which are placed a series of numerically or alphabetically identifiable buttons 111 for engaging control mechanisms within the housing. The buttons 111 in the form shown allow their extended ends to be directly engaged by the finger of an operator.

The stems 112 of buttons 105 pass through the face plate 101 and the control mechanisms within the casing. The stems 112 of the buttons 111 are slotted 113, 114, 115 at specific points for reasons which will be apparent later. A total of 10 buttons are shown of which there can be a number of different types. The type of button is determined by the specific locations where slots 112 are cut on the stem. The different types of buttons enable different combinations to be made for opening the lock by depressing certain selected buttons. The slots 113, 114, 115 are placed in relatively upper, intermediate and lower positions on stems 112. Also, these slots can have various widths, or can be omitted as necessary to obtain the desired combinations.

A control mechanism is formed by two mechanisms that are assembled together to function as a locking device and actuator. A first mechanism includes three movable plates 140 which include apertures 142 that allow the stems of the buttons to pass through. These openings 142 are identical in proportion to the openings 110 in face plate 101. These plates 140 are assembled into grooved tracks on the inner walls 101, 103 of the top housing. Within these grooved tracks, the plates slide independently upon the operator's opening of the lock. The plates 140 are held in position between the stems of the buttons and the second control mechanism 125 when the lock is in the locked position.

Upon the entry of one of the three possible access codes by depressing selected buttons 111, one of the three plates would be permitted to slide into the designated slots 113, 114, 115 on the stems of the buttons. As noted above, the slots have different widths so that they can either allow the plates to pass when its respective button is not depressed and/or allow the plates to pass when depressed. Thus, by depressing the correct series of selected buttons, all three plates can slide to allow opening of the lock.

A selective actuator 125 causes the designated plate or plates 140 to slide when the correct code is manually entered on the buttons and the control knob 130 is turned 180 degrees clock-wise. Control knob 130 is biased by spring 109 for ease in operation. Turning the control knob 130 causes the control shaft 135 to turn and its contact flange 136 to meet with a sliding bolt 120 inside of the selective actuator 125. When rotated to the fully opened position the contact flange 136 of the control shaft 135 causes the bolt 120 to linearly actuate specific elements of a series of ball-bearing like gears 138. When actuated, the gears will be forced into a specific order that is determined when one of the three plates is allowed to slide upon the entry of one of three possible access codes. Entering the proper code upon the buttons aligns specific designated slots 113, 114, 115 on the buttons with the required plate or plates 140 allowing them to slide into the slots of the pressed buttons.

Thus, at the instant the flange 136 on the control shaft 135 makes contact with the sliding bolt 120, an identical flange 137 on the opposite side of the control shaft makes contact with a flange contact 144 at the base of a knob 190. This knob 190 is held in a locked position by the tension exerted on it from spring 119. The spring 119 is sufficiently rugged to prevent the lock from opening due to a sudden jolt or due to vibration. Further rotation of the control knob 130 causes simultaneous actuation of the sliding bolt 120 and retraction of the bolt 145, thus ultimately opening the lock.

Further rotation of the control knob 130 causes the flanges 136, 137 on the control shaft 135 to make contact with and simultaneously actuate two different but functionally analogous latch release contacts 180 and 185. One latch release actuator 180 is activated by the full retraction of bolt 145. The other 185 is activated when a flange 136 on the control shaft stem 135 rotates past sliding bolt 120 and further contacts with latch release actuator 185 causing it to swivel in a specific direction. Both latch release actuators simultaneously contact the latch release contact 116. Upon contact and with further actuation, the latch release actuators 180, 185 cause the latch release 170 and its latch release arms 175 to retract and pull all latches 155 from their button locking positions. This action allows the buttons, previously in a pressed and locked position to spring up, back into their unlocked position, by means of spring-latch 165 located beneath the buttons when the lock is assembled.

Spring-latch 165 is so-called because it is a single part, more specifically a single sheet of high-strength material manufactured in a unique configuration that permits the structure to function as a spring and a latch for the specific purpose for which it was designed. Upon full manual depression of a button, the button of its stem causes the spring part 150 of the spring-latch 165 to bend as designed allowing recession of the button to a specific depth within the lock. When the stem of the button has reached a specific depth within the lock, the latch part 155 of the spring-latch 165 latches on to a catch on the bottom of the stem of the button, thus locking the button in position until released by the latch release 170.

Two of the three plates have extending flanges 143 which when actuated in the process of unlocking the lock, protrude from the lock to act as an actuating contact. These contacts can be used to send the alarm signals as described above. Also, other uses for these contacts range in variety as much as in function by the way the lock is assembled and utilized.

Access is attained by pushing the correct numbered buttons 105, then turning knob 130 and rotary contact 135. Rotary contact 135 meets actuator contact 120 and bolt contact 144 simultaneously when turned clockwise. This action causes the actuator contact 120 to slide toward center of actuator 125 and push balls 138 into plates 140. The balls 138 will push one of the plates 140, depending upon the code that is used. While the rotary contact 135 is turning past actuator contact 120 it simultaneously presses against bolt contact 144 causing bolt 145 to retract, thus allowing lock 100 to open.

Button 105 is biased upwardly by a spring latch 150. When latch on button 105 is pushed into lock 100, spring latch 150 is suppressed while catch 160 on bottom of button 105 is engaged by latch part 155 of spring latch 150. Button 105 is locked into "pushed" position until latch release 170 with its latch release arms 175 pull spring latches 150 off of buttons 105 thereby allowing them to spring back up. The primary latch release activator 180 actuates latch release 170 when bolt 190 full retracts making contact with the primary release actuator 180 or when rotary contact 115 makes contact with secondary latch release actuator 185 actuating latch release 170, causing buttons to spring up.

Figure 12:
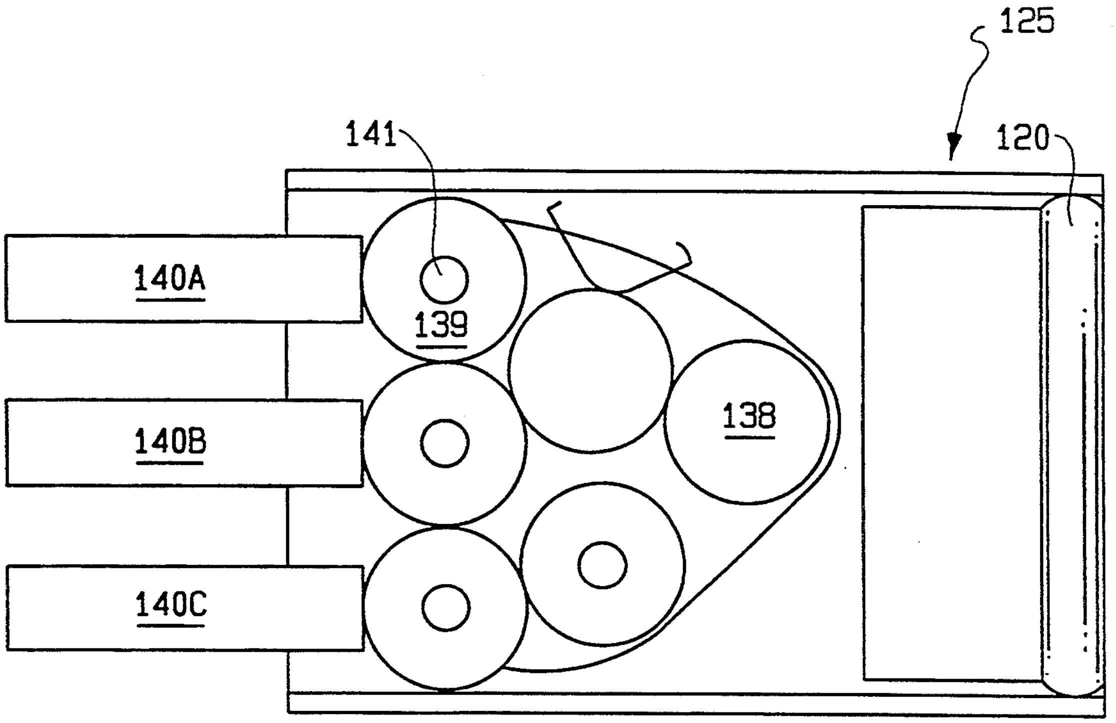
Figure 13:
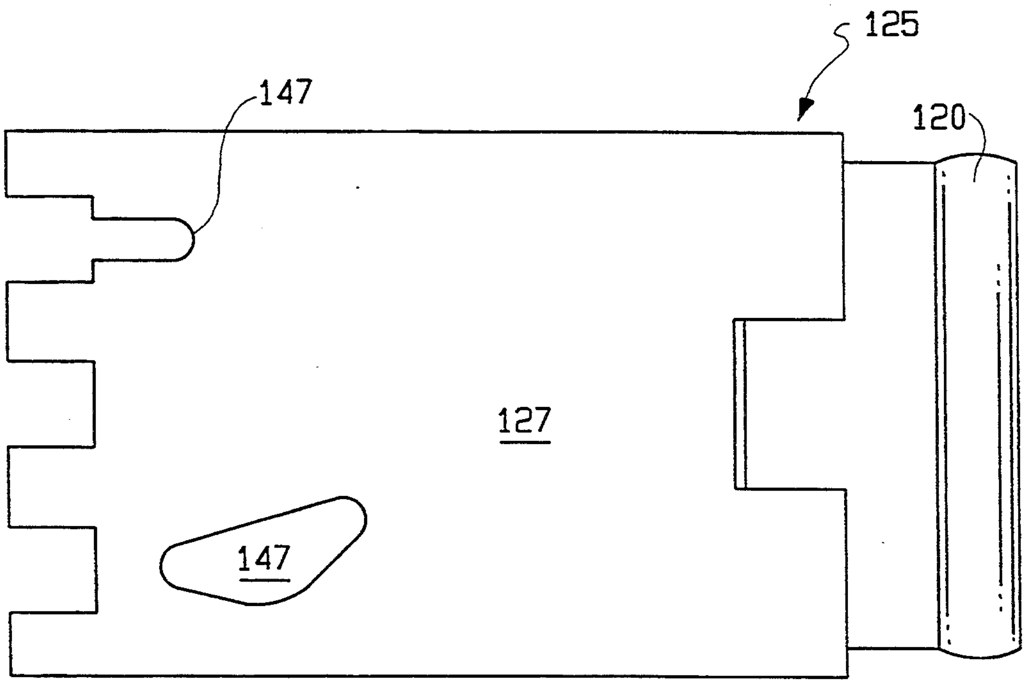

A detail of the selective actuator 125 is provided by FIGS. 12 and 13. Actuator 120 is provided in a housing having specially designed side plates 127. Certain ball bearings 139 are provided with pins 141 for movement in guide slots 147. Thus, upon movement of actuator 120, balls 138, 139 move accordingly so that the desired plate or plates 140 A,B,C move to open the lock. If the incorrect code is entered upon pressing buttons 110, the plates cannot move, because they abut non-slotted portions of the button stems. Guide slots 147 allow movement of bearings 139 only in certain directions to provide additional control over which plates 140 A,B,C are moved.

To reset the lock, knob 190 is depressed. This causes latch 180 to release all buttons which were previously depressed.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A security system for the containment of at least one firearm in a repository, comprising:
- a firearm;
- a repository comprising a container structure which is configured and dimensioned to receive at least a portion of said firearm;
- locking means for securing said firearm or said firearm portion in said repository;
- means for releasing said locking means to unlock said repository and facilitate access to said firearm, said releasing means including:
  - an electrical lock release;
  - means for selectively actuating the electrical lock release; and
  - alarm means responsive to selective activations of said electrical lock release, including:
    - means for generating at a remote location a first alarm signal indicative of an emergency condition in response to a first selective actuation of the electrical lock release; and
    - means for generating at the remote location a second alarm signal indicative of a non-emergency condition in response to a second actuation of the electrical lock release; and
    - means for bypassing the alarm weans to access said firearm in said repository without generating an alarm signal, said alarm bypassing means comprising a separately actuatable mechanical lock for accessing said repository and firearm, wherein the mechanical lock is operatively associated with the electrical lock release and includes a locking mechanism comprising:
      - a housing having a plurality of apertures and an internal cavity therein;
      - a plurality of selectively actuatable buttons, each positioned in a separate housing aperture and having a first end which extends away from the housing, a second end which is positioned in the housing cavity and a plurality of slots therebetween;
      - a control mechanism associated with each button and positioned adjacent the second ends thereof, said control mechanism comprising a plurality of apertured plates slideably mounted within the housing and means for selectively sliding the plates into desired positions, wherein actuation of certain buttons permits the selectively sliding means to position at least one of the apertured plates in alignment with the buttons such that the notches of the actuated buttons engage apertures in the plate, thus unlocking the mechanism.

2. A firearm security system as claimed in claim 1, wherein said alarm means further comprises telephone means for transmitting said first and second alarm signals to the remote location.

3. A firearm security system as claimed in claim 2, wherein the means for selectively actuating the releasing means comprises a manually-operable programmable keypad, the telephone means for transmitting said first and second alarm signals to the remote location includes a telephone line, and the means for generating the first and second alarm signals each comprise a code which is entered through the keypad.

4. A firearm security system as claimed in claim 1, which further comprises audio alarm means associated with said firearm repository for triggering the emitting of an audio or visual alarm responsive to the first selective actuation of the electrical lock release.

5. A firearm security system as claimed in claim 1, wherein said firearm repository comprises a closed box-shaped container structure and a drawer for said firearm in said container structure, said mechanical lock latching said drawer in said container structure in the closed position of said repository, said electrical lock release capable of disengaging the latching engagement of said drawer with said container structure responsive to the selective actuation of said electrical lock release to facilitate access to the firearm and contents of said repository.

6. A firearm security system as claimed in claim 1, wherein said firearm repository comprises a substantially bulletproof wall structure for safely storing a loaded firearm.

7. A firearm security system as claimed in claim 1, wherein the firearm is a long-barreled firearm and the locking means of said firearm repository further comprises a latching arrangement for a rack structure for latching said long-barreled firearm to said rack structure.

8. A firearm security system as claimed in claim 7, wherein a plurality of long-barreled firearms are present and said latching arrangement encompasses at least the trigger-actuating portions of said firearms to inhibit access thereto when said firearms are locked in said rack structure.

9. A firearm security system as claimed in claim 8, wherein said rack structure includes a bullet-proof end portion for housing the muzzle ends of said long, barreled firearms.

10. A firearm security system as claimed in claim 3, wherein the remote location is a police station or security service locale and the alarm means bypass means comprises a code which is entered through the keypad.

11. A firearm security system as claimed in claim 1, wherein said housing includes grooves for slideably receiving said plates, and said selectively sliding means includes a rotatable control knob operatively associated with at least one flange member.

12. A firearm security system as claimed in claim 1, further comprising a plurality of latch release actuators, each of which releasably engages the notches of a corresponding button to retain said button in an actuated position.

13. A firearm security system as claimed in claim 1, further comprising a sliding bolt and a plurality of ball bearing gears operatively associated with said control knob and sliding apertured plates such that rotation of the knob causes the bolt to slidingly actuate the ball bearing gears which, in turn, cause the at least one apertured plate to slide into the desired position, thus opening the lock.

14. A security system for the containment of at least one firearm in a repository, comprising:

a firearm including a trigger portion;

a repository comprising a container structure which is configured and dimensioned to receive at least a portion of the firearm including the trigger portion;

locking means including a latching mechanism for securing said firearm or firearm portion in said repository;

means for releasing said locking means to unlock said repository and facilitate access to said firearm, said releasing means including:

an electrical lock release operatively associated with the latching mechanism;

a manually operable programmable keypad for selectively actuating the electrical lock release; and alarm means responsive to selective activations of said electrical lock release, said alarm means including:

means for generating at a remote location a first alarm signal indicative of an emergency condition in response to a first selective actuation of the electrical lock release; and means for generating at a remote location a second alarm signal indicative of a non-emergency condition in response to a second actuation of the electrical lock release; and means for bypassing the alarm means to access said firearm in said repository without generating an alarm signal, said alarm bypassing means comprising a separately actuatable mechanical lock for accessing said repository and firearm, wherein the mechanical lock is operatively associated with the electrical lock release and includes a locking mechanism comprising:

a housing having a plurality of apertures and an internal cavity therein;

a plurality of selectively actuatable buttons, each positioned in a separate housing aperture and having a first end which extends away from the housing, a second end which is positioned in the housing cavity and a plurality of slots therebetween;

a control mechanism associated with each button and positioned adjacent the second ends thereof, said control mechanism comprising a plurality of apertured plates slideably mounted within the housing and means for selectively sliding the plates into desired positions, wherein actuation of certain buttons permits the selectively sliding means to position at least one of the apertured plates in alignment with the buttons such that the notches of the actuated buttons engage apertures in the plate, thus unlocking the mechanism.

15. A firearm security system as claimed in claim 14 wherein said firearm repository comprises a closed box-shaped container structure and a movable drawer for said firearm in said container structure, said latching mechanism locking said drawer in said container structure in the closed position of said repository, said electrical lock release capable of disengaging the latching mechanism responsive to the selective actuation of said electrical lock release to allow movement of the drawer to an open position to facilitate access to the firearm and contents of said repository; and further wherein the means for generating the first and second alarm signals each comprise a code which is entered through the keypad.

16. A firearm security system as claimed in claim 14, wherein the firearm is at least one long-barreled firearm and further comprising a rack structure with the latching mechanism of the locking means capable of latching at least the trigger portion of said long-barreled firearm to said rack structure to inhibit access thereto when said firearm is locked in said rack structure.

17. A firearm security system as claimed in claim 14, wherein the alarm means bypass means comprises a code which is entered through the keypad or a key member for releasing the locking means, and which further comprises audio alarm means associated with said firearm repository for triggering the emitting of an audio or visual alarm responsive to the first selective actuation of the electrical lock release.

* * * * *